United States Patent [19]
Dieden et al.

[11] Patent Number: 5,218,847
[45] Date of Patent: Jun. 15, 1993

[54] LOCKING ARRANGEMENT BETWEEN AN IGNITION LOCK AND THE SELECTOR LEVER OF AN AUTOMATIC MOTOR VEHICLE TRANSMISSION

[75] Inventors: Thomas Dieden, Wiernsheim; Bernd Plocher, Rottenburg, both of Fed. Rep. of Germany

[73] Assignee: Dr. Ing. h.c.F. Porsche AG, Fed. Rep. of Germany

[21] Appl. No.: 901,036

[22] Filed: Jun. 19, 1992

[30] Foreign Application Priority Data

Jun. 20, 1991 [DE] Fed. Rep. of Germany ....... 4120380

[51] Int. Cl.⁵ ............................................. B60R 25/06
[52] U.S. Cl. ..................................... 70/247; 70/252; 74/526; 74/527; 74/529; 74/878; 180/336; 192/4 A
[58] Field of Search ................. 70/245, 247, 248, 251, 70/252; 180/336; 192/4 A; 74/878, 526, 527, 529

[56] References Cited

U.S. PATENT DOCUMENTS

| | | | |
|---|---|---|---|
| 1,762,116 | 6/1930 | Bolles et al. | 70/247 |
| 1,771,310 | 7/1930 | Peterson | 70/247 |
| 4,520,640 | 6/1985 | Kramer | 70/248 |
| 4,932,493 | 6/1990 | Sakurai et al. | 70/248 X |
| 4,967,883 | 11/1990 | Kito et al. | 70/248 X |
| 5,003,799 | 4/1991 | Imai et al. | 74/878 X |
| 5,133,436 | 7/1992 | de Crouppe et al. | 192/4 A |

FOREIGN PATENT DOCUMENTS 0315174 5/1989 European Pat. Off. .
01-03558 4/1989 Japan ..................... 70/248

Primary Examiner—Lloyd A. Gall
Attorney, Agent, or Firm—Evenson, McKeown, Edwards & Lenahan

[57] ABSTRACT

A locking arrangement between an ignition lock and the selector lever of an automatic motor vehicle transmission has a locking slide arranged on the selector-lever side which, via a control ramp, displaces a locking bolt into a position blocking locking pin. This blocking position can only be achieved when the selector lever with the inoperative button is in the parking position and an ignition key has been rotated into an inoperative position. When the ignition key is pulled out, the selector lever cannot move out of the parking position, thereby preventing an accidental engaging, for example, in a neutral position.

7 Claims, 3 Drawing Sheets

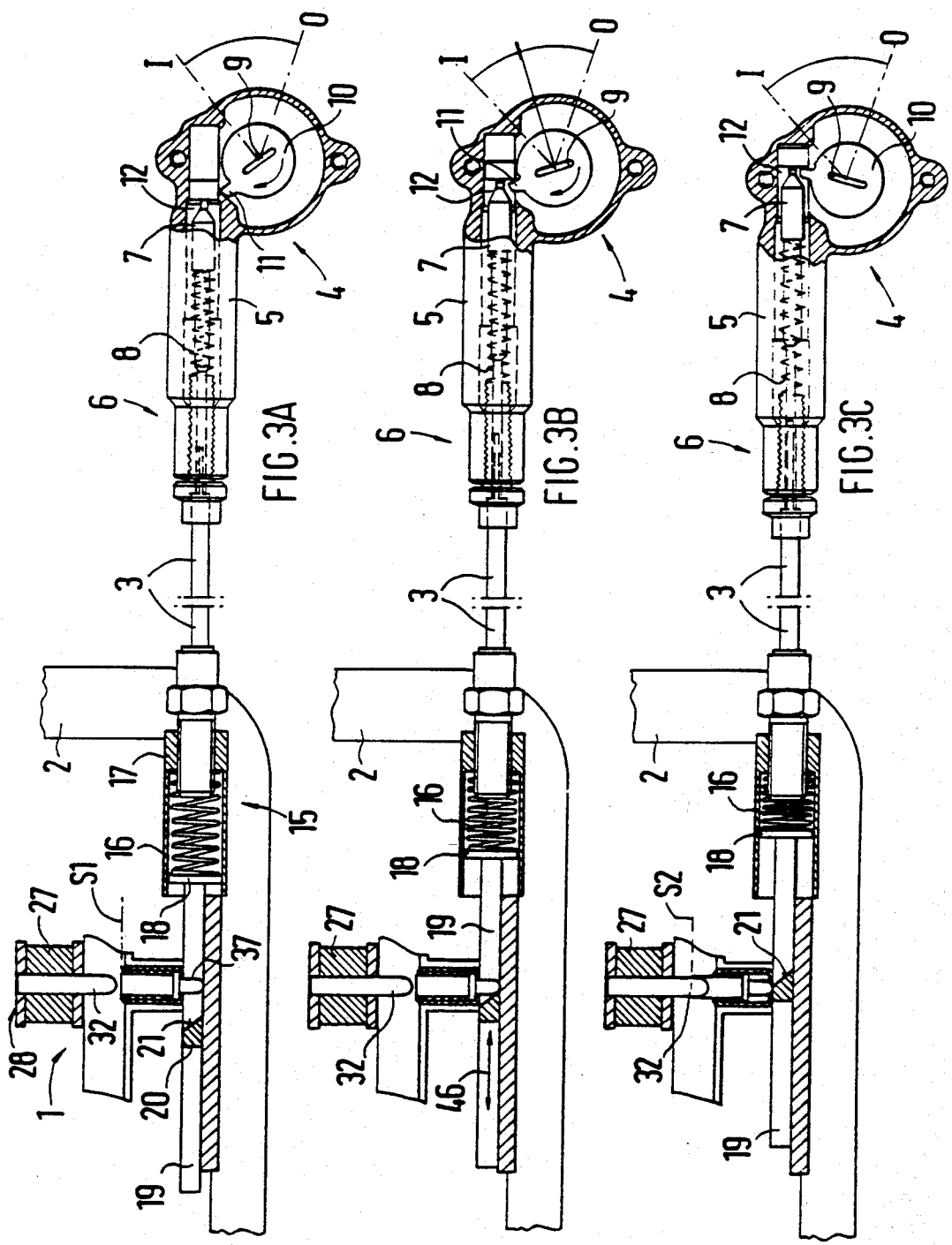

LOCKING ARRANGEMENT BETWEEN AN IGNITION LOCK AND THE SELECTOR LEVER OF AN AUTOMATIC MOTOR VEHICLE TRANSMISSION

BACKGROUND AND SUMMARY OF THE INVENTION

This application is related to application Ser. No. 07/901,225, filed on even date, and based on German Patent Application P 41 20 382.8; and application Ser. No. 07/901,595 filed on even date, and based on German Patent Application P 41 20 379.8.

The present invention relates to a locking arrangement between an ignition lock and the selector lever of an automatic motor vehicle transmission. The selector lever is held pivotally into various positions in a housing and is lockable in a parking position via a locking pin which engages in a recess of a gate and can be manually displaced via a button. The locking pin has a locking slide which, by way of a flexible linkage, interacts in such a manner with the ignition lock that the ignition key can be pulled out only in the inoperative position of the ignition lock when the selector lever is in the parking position and the button is not operated, with the locking slide preventing the displacement of the locking pin. The selector lever is locked in the parking position until the ignition key has been rotated in the direction of a first operative position whereby the locking slide releases the locking pin.

European Patent Document EP-0 315 174 A1 shows a locking arrangement of the above-mentioned type in which a button, that is to be operated manually, is arranged on a selector lever that can be swivelled into various positions. A slidable locking pin is coupled with this button which engages in recesses of a gate and in the process fixes the selector lever in a parking position when the button is not operated.

During the swivelling with the operated button into the parking position, the locking pin engages in a sliding piece which, when the button is released, is displaced by means of the locking pin.

By way of a flexible linkage, an ignition lock acts on the sliding piece by means of a locking slide which is disposed on the selector-lever-side. Thus, only when the selector lever is fixed in the parking position can the ignition lock be rotated into a position permitting the pulling-out of the ignition key, in which case the locking slide is displaced into a position locking the sliding piece. The selector lever is locked in this position until the ignition key has rotated the ignition lock into an operative position and a brake pedal has been actuated, whereby a pressure spring supported in the selector lever housing displaces the locking slide into a position releasing the sliding piece.

It is an object of the invention to provide a locking arrangement between an ignition lock and the selector lever of an automatic motor vehicle transmission which ensures a secure locking of the selector lever in a parking position while the ignition lock is rotated into the inoperative position.

This and other objects are achieved by the present invention which provides a locking arrangement between an ignition lock and the selector lever of an automatic motor vehicle transmission. The locking arrangement has a housing in which the selector lever is held pivotally in various positions in a housing. A locking pin engages in a recess of a gate and is manually displaceable by a button, the locking pin locking the selector lever in a parking position via the engagement of the locking pin in the recess of the gate. A flexible linkage is connected to the ignition lock. A locking slide with a control ramp interacts via the flexible linkage in such a manner with the ignition lock that an ignition key can be pulled out of the ignition lock only in an inoperative position of the ignition lock when the selector lever is in the parking position and the button is not operated. The locking slide prevents the displacement of the locking pin, and locks the selector lever in the parking position until the ignition key has been rotated in a direction of a first operative position whereby the locking slide releases the locking pin. A displaceable locking bolt is arranged in the housing. The control ramp and the locking bolt are arranged such that when the selector lever is locked in the parking position, the locking bolt is displaced by the control ramp into a position fixing the locking pin.

The locking slide has a control ramp which, for the locking of the selector lever, shifts a locking bolt, which is slidably disposed in the housing, into a position which fixes the locking pin on the selector lever. As a result, the button cannot be pushed, and the selector lever cannot leave the locked position.

Advantageously, this arrangement has a secure coupling between the ignition lock and the selector lever. As long as the selector lever is not in a parking position, its button can be operated in an unhindered manner, and the ignition lock cannot be rotated into the inoperative position. After the swivelling of the selector lever with the pushed button into the parking position, the ignition lock can be rotated in the direction of the inoperative position, but does not reach it because the locking bolt collides with the locking pin. It is only after the button is released that the inoperative position can be reached, whereby the control ramp shifts the locking bolt into the position fixing the locking pin.

In another embodiment of the invention, in the parking position, the operation of the button is sensed by a locking bow locking the locking slide. As a result, it is prevented that, for example, in the case of right-side steered motor vehicles, by means of one hand, the selector lever is held in the parking position when the button is operated, while, with the other hand, the ignition lock is held by means of the ignition key in a position between a first operating position and the inoperative position. In this case, it would be possible to swivel the selector lever into a driving position and then pull-out the ignition key. However, the locking bow will not release the locking slide until after the button has been released.

Other objects, advantages and novel features of the present invention will become apparent from the following detailed description of the invention when considered in conjunction with the accompanying drawings.

BRIEF DESCRIPTION OF THE DRAWINGS

FIGS. 3A to 3C are sectional views along Line III—III according to FIG. 2 showing an ignition lock in various positions.

DETAILED DESCRIPTION OF THE DRAWINGS

Figure 1:
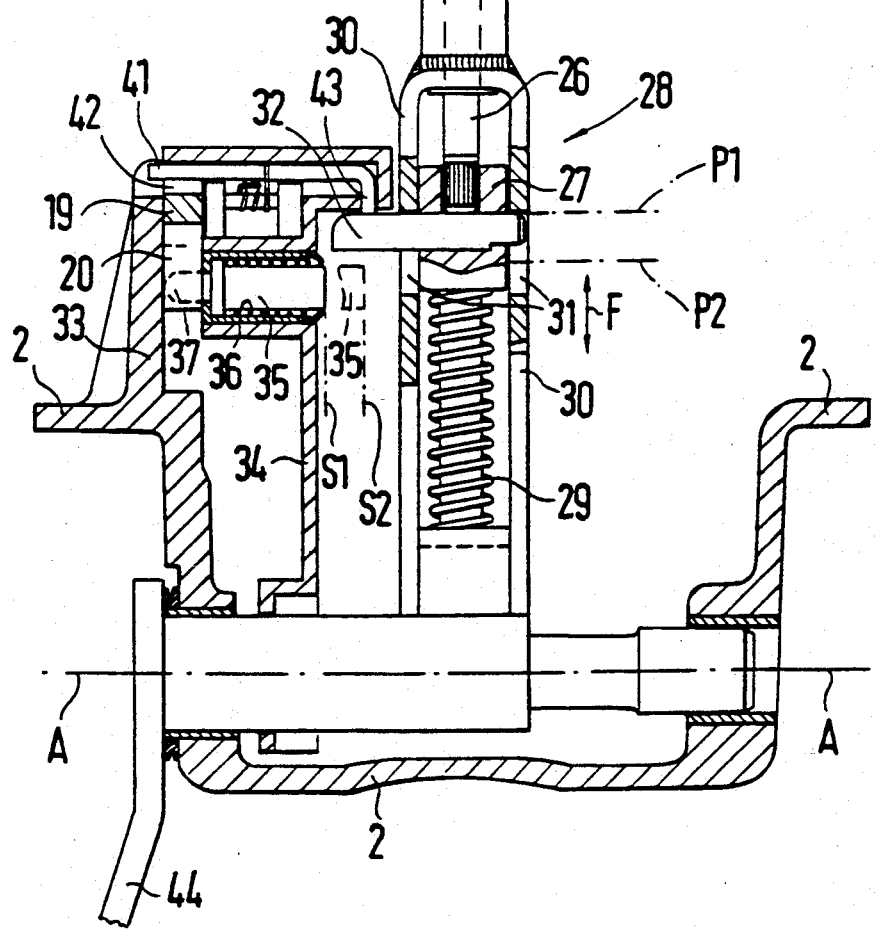
FIG. 1 is a sectional view along Line I—I according to FIG. 2.

A selector lever 1 for an automatic motor vehicle transmission, which is not shown, is disposed rotatably about an axis A in a housing 2. By way of a flexible linkage 3, the housing 2 is connected with an ignition lock 4 arranged in the proximity of a steering wheel which is not shown. This ignition lock 4 has a housing 5 on which the ignition-lockside end 6 of the linkage 3 is held. In the housing 5, a spring 8 is supported which, by means of a spring force K1, acts upon a slide 7 which is connected with the linkage 3 and is slidably disposed in the housing 5, the spring 8 exercising a tensile stress on the linkage 3.

In the housing 5, a disk 10 is arranged which can be rotated together with an ignition key 9 and which has a cam 11. The slide 10 has a receiving device 12 which corresponds with the cam 11. On the selector-lever-side end 15, a spring 16, which is provided with a spring force K2, is supported in a sleeve 17 of the housing 2. Spring force K2 is higher than spring force K1. This spring 16 acts upon a disk 18 which can be slid in the sleeve 17 for the longitudinal guiding of a locking slide 19 and is connected with the linkage 3. Thus the linkage 3 is subjected to tensile stress on both sides.

The disk 18 is constructed in one piece with the locking slide 19 which is slidably disposed in the housing 2 and which has a cam 20 with an oblique control ramp 21.

As seen in FIG. 1, on its upper end, the selector lever 1 has a button 25, which is to be operated manually and which, by way of a rod 26, acts upon a sliding block 27 which is slidably disposed in the lower, U-shaped end 28 of the selector lever 1. In the inoperative condition, the sliding block 27, loaded by a pressure spring 29, is situated in an upper position P1. When the button 25 is operated, the sliding block 27 is situated in a lower position P2.

The two legs 30 of the end 28 have slots 31 which are penetrated by a locking pin 32 disposed in the sliding block 27.

In a partition 34 arranged between a lateral housing wall 33 and the selector lever 1, a displaceable locking bolt 35 is arranged in parallel to the locking pin 32. This locking bolt 35 is prestressed by a pressure spring 36 into a position S1 and therefore rests against the housing wall 33 by means of a cap 37.

Figure 2:
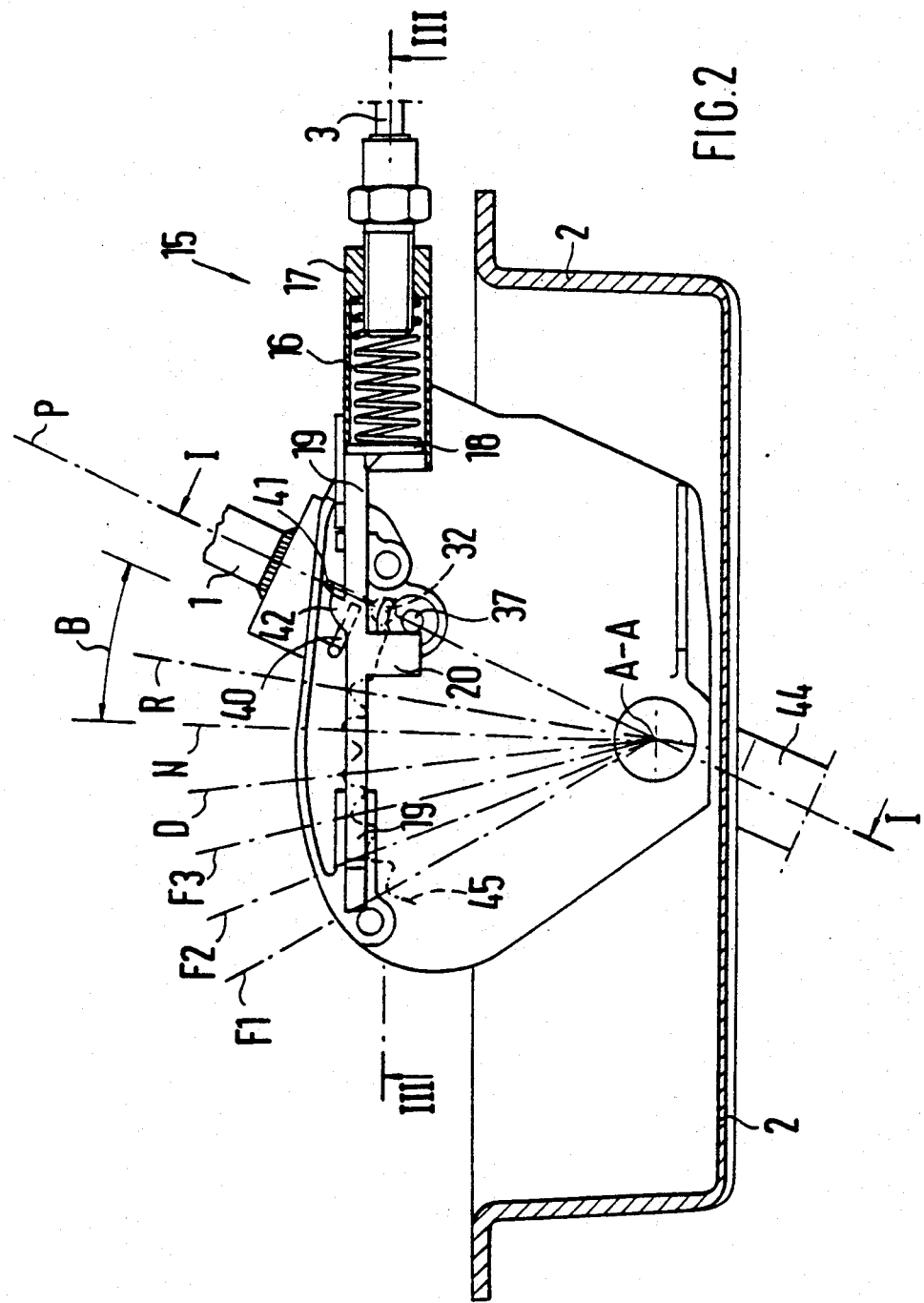
FIG. 2 is a lateral view of a locking arrangement constructed in accordance with an embodiment of the present invention.

Above the locking slide 19, according to FIG. 2, a two-armed locking bow 40, which is spring-loaded clockwise, is pivotally disposed in the housing 2. One arm 41 of the locking bow 40 rests against a cam 42, which locks the locking slide 19, this arm 41 having a bent section 43 which rests against the locking pin 32.

During the operation of the motor vehicle, the selector lever 1 can be swivelled in the direction of the movement arrow B about the axis A—A into various driving positions D, F3, F2, F1, a neutral position N as well as a parking position P, in which case a lever 44 is connected with the transmission which is not shown.

According to FIG. 3a, the ignition key 9 is in the ignition lock 4 which is rotated into a first operating position I. The spring 16, which is applied to the locking slide 19, because of the higher spring force K2, holds the slide 7 in the position which prevents a rotating of the disk 10 and holds the locking slide 19 in a left end position. The selector lever 1 is in a driving position or the neutral position N and is not in contact with the locking slide 19. By means of the button 25, the locking pin 32, in an unimpaired manner, can be moved back and forth in the direction of an arrow F into position P1 or P2. In this case, the locking pin 32 engages in a corresponding recess of a gate 45 which is shown by an interrupted line only in FIG. 2.

When the selector lever 1 with the pushed button 25 is swivelled into the parking position P, the selector lever 1 comes in contact with the locking slide 19 and, in this case, in a manner not shown in detail, displaces this slide 19 according to FIG. 3B into a center position. In this case, the control ramp 21 moves on a moving path 46 in the direction of the cap 37, and a portion of the spring force K2 is absorbed by the selector lever 1, and the spring 16 is therefore relieved with respect to the linkage 3. Therefore, the slide 7 is displaced to the right as a result of the spring force K1 so that the cam II can engage in the receiving device 12. The ignition lock 4 can be rotated in the direction of an inoperative position 0, but does not reach it when the button 25 is operated because, when the ignition key 9 is rotated farther, the control ramp 21 pushes the locking bolt 35 against the locking pin 32.

In order to prevent, when the selector lever 1 and the ignition key 4 are operated with both hands and simultaneously, (when in the position of FIG. 3B), the selector lever 1 with the pushed button 25 from being swivelled back from the parking position P and the ignition lock 4 from being rotated into the inoperative position permitting the pulling-out of the ignition key 9, the arm 41 rests against the cam 42 which locks the locking slide 19. As a result, the ignition key 4 cannot be rotated farther.

It is only after the button 25 is released that the locking pin 32, by way of the section 43, takes the arm 41 away from the contact with the cam 42 which locks the locking slide 19.

The ignition lock 4 can now be rotated into the inoperative position 0, in which case the control ramp 21 according to FIG. 3c displaces the locking bolt 35 into a second position S2 below the locking pin 32. As a result, the locking pin 32 is fixed, and the selector lever I is locked in the parking position. The button 25 cannot be pressed, and the ignition key 9 can be pulled out.

When the motor vehicle is to be operated, after the insertion of the ignition key 9 into the ignition lock 4, a slight rotation of the ignition key 9 in the direction of the operating position I releases the linkage 3 so that the spring force K2 brings the locking slide 19 into the center position according to FIG. 3B, and the control ramp 21 releases the locking bolt 35 into the position S1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A locking arrangement between an ignition lock and a selector lever of an automatic motor vehicle transmission, comprising:
   a housing in which the selector lever is held pivotally in various positions in the housing;
   a locking pin which engages in a recess of a gate and is manually displaceable by a button, the locking pin locking the selector lever in a parking position;
   a flexible linkage connected to the ignition lock;

a locking slide having a control ramp, the locking slide interacting via the flexible linkage in such a manner with the ignition lock that an ignition key can be pulled out of the ignition lock only in an inoperative position of the ignition lock when the selector lever is in the parking position and the button is not operated, the locking slide preventing the displacement of the locking pin, and locking the selector lever in the parking position until the ignition key has been rotated in a direction of a first operative position whereby the locking slide releases the locking pin;

a displaceable locking bolt arranged in the housing and which is parallel to the locking pin;

wherein the control ramp and the locking bolt are arranged such that when the selector lever is locked in the parking position, the locking bolt is displaced in a direction parallel to the locking pin by the control ramp into a position locking the locking pin.

2. An arrangement according to claim 1, wherein when the selector lever is unlocked, the locking bolt is loaded by a spring and is in a position which releases the locking pin and is in the moving path of the locking slide carrying the control ramp.

3. An arrangement according to claim 1, wherein the locking slide is provided on one end with a disk which is displaceably disposed in a housing-side sleeve and is connected with the linkage to thereby provide longitudinal guiding of the locking slide.

4. An arrangement according to claim 1, further comprising an ignition-lock slide arranged on an ignition-lock end of the linkage, a first spring applied to the ignition-lock slide which is supported in a housing, the first spring subjecting the linkage to tensile stress and acting with a first spring force, and on a selector-lever end, a second spring acting on the locking slide with a second spring force supporting the linkage while subjecting it to tensile stress, the first spring force being lower than the second spring force.

5. An arrangement according to claim 2, further comprising a locking bow pivotally disposed in the housing and a cam on the locking slide, the cam resting against the locking bow while locking the locking slide when the button is operated.

6. A locking arrangement between an ignition lock and a selector lever of an automatic motor vehicle transmission, comprising:

a housing in which the selector lever is held pivotally in various positions in the housing;

a locking pin which engages in a recess of a gate and is manually displaceable by a button, the locking pin locking the selector lever in a parking position;

a flexible linkage connected to the ignition lock;

a locking slide having a control ramp, the locking slide interacting via the flexible linkage in such a manner with the ignition lock that an ignition key can be pulled out of the ignition lock only in an inoperative position of the ignition lock when the selector lever is in the parking position and the button is not operated, the locking slide preventing the displacement of the locking pin, and locking the selector lever in the parking position until the ignition key has been rotated in a direction of a first operative position whereby the locking slide releases the locking pin;

a displaceable locking bolt arranged in the housing, wherein the control ramp and the locking bolt are arranged such that when the selector lever is locked in the parking position, the locking bolt is displaced by the control ramp into a position locking the locking pin;

an ignition-lock slide arranged on an ignition-lock end of the linkage;

a first spring applied to the ignition-lock slide which is supported in a housing, the first spring subjecting the linkage to tensile stress and acting with a first spring force, and on a selector-lever end; and a second spring acting on the locking slide with a second spring force supporting the linkage while subjecting it to tensile stress, the first spring force being lower than the second spring force.

7. A locking arrangement between an ignition lock and a selector lever of an automatic motor vehicle transmission, comprising:

a housing in which the selector lever is held pivotally in various positions in the housing;

a locking pin which engages in a recess of a gate and is manually displaceable by a button, the locking pin locking the selector lever in a parking position;

a flexible linkage connected to the ignition lock;

a locking slide having a control ramp, the locking slide interacting via the flexible linkage in such a manner with the ignition lock that an ignition key can be pulled out of the ignition lock only in an inoperative position of the ignition lock when the selector lever is in the parking position and the button is not operated, the locking slide preventing the displacement of the locking pin, and locking the selector lever in the parking position until the ignition key has been rotated in a direction of a first operative position whereby the locking slide releases the locking pin;

a displaceable locking bolt arranged in the housing;

wherein the control ramp and the locking bolt are arranged such that when the selector lever is locked in the parking position, the locking bolt is displaced by the control ramp into a position locking the locking pin;

wherein when the selector lever is unlocked, the locking bolt is loaded by a spring and is in a position which releases the locking pin and is in the moving path of the locking slide carrying the control ramp;

the arrangement further comprising a locking bow pivotally disposed in the housing and a cam on the locking slide, the cam resting against the locking bow while locking the locking slide when the button is operated.

* * * * *